United States Patent
Kulkarni et al.

(10) Patent No.: US 9,998,276 B2
(45) Date of Patent: Jun. 12, 2018

(54) USBPD TYPE-C BMC ENCODED RECEIVE MESSAGE SQUELCH DETECTION

(71) Applicant: NXP B.V., Eindhoven (NL)

(72) Inventors: Abhijeet Chandrakant Kulkarni, Chandler, AZ (US); Kenneth Jaramillo, Gilbert, AZ (US); Siamak Delshadpour, Chandler, AZ (US)

(73) Assignee: NXP B.V., Eindhoven (NL)

( * ) Notice: Subject to any disclaimer, the term of this patent is extended or adjusted under 35 U.S.C. 154(b) by 0 days. days.

(21) Appl. No.: 15/277,707

(22) Filed: Sep. 27, 2016

(65) Prior Publication Data
US 2018/0091289 A1  Mar. 29, 2018

(51) Int. Cl.
G06F 1/32 (2006.01)
H04L 7/033 (2006.01)
H04L 12/10 (2006.01)

(52) U.S. Cl.
CPC .............. *H04L 7/033* (2013.01); *H04L 12/10* (2013.01); *G06F 1/3253* (2013.01)

(58) Field of Classification Search
CPC ........ G06F 1/3253; G06F 1/3287; G06F 1/26; G06F 1/266; G06F 1/3206; G06F 1/3215; Y02B 60/1228; Y02B 60/1235; H04L 7/033; H04L 12/10
See application file for complete search history.

(56) References Cited

U.S. PATENT DOCUMENTS

| | | | | |
|---|---|---|---|---|
| 4,787,095 A | * | 11/1988 | Forth | ........................ H04L 7/10 375/365 |
| 5,268,934 A | * | 12/1993 | Sharma | ..................... H04L 5/24 375/370 |
| 2014/0208134 A1 | | 7/2014 | Waters | |
| 2015/0362984 A1 | | 12/2015 | Waters | |
| 2015/0378409 A1 | | 12/2015 | Dunstan et al. | |
| 2017/0060216 A1 | * | 3/2017 | Waters | ...................... G06F 1/30 |

FOREIGN PATENT DOCUMENTS

EP  1008030 B1  4/2007

OTHER PUBLICATIONS

Canova Tech; "CT20600—USB Power Delivery PHY Interface"; 1 page (Dec. 2015).
Hyde, John et al; "Cypress—Designing USB Type-C Products Using Cypress's CCG1 Controllers"; AN96527 Application Note; 31 pages (Dec. 2015).
Texas Instruments; "TUSB320 USB Type-C (TM) Configuration Channel Logic and Port Control—SLLSEN9A"; 33 pages (Jun. 2015).

\* cited by examiner

*Primary Examiner* — Jean B Corrielus

(57) ABSTRACT

Disclosed is a method of controlling a USB Power Delivery System including determining whether at least a predetermined length of initial bits of a message is received, turning on a clock when the predetermined length is received, determining whether the message has stopped, starting a counter when the message has stopped, determining whether a count value of the counter has reached a predetermined value, and turning off the clock when the predetermined count value has been reached.

14 Claims, 4 Drawing Sheets

USBPD TYPE-C BMC ENCODED RECEIVE MESSAGE SQUELCH DETECTION

TECHNICAL FIELD

Various exemplary embodiments disclosed herein relate to power delivery messaging in USB interfaces.

SUMMARY

A brief summary of various embodiments is presented below. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various exemplary embodiments are related to a method of controlling a USB Power Delivery System, including determining whether at least a predetermined length of initial bits of a message is received, turning on a clock when the predetermined length is received, determining whether the message has stopped, starting a counter when the message has stopped, determining whether a count value of the counter has reached a predetermined value, and turning off the clock when the predetermined count value has been reached.

The method may include receiving the message by an analog circuit.

The determining of a predetermined length may be performed asynchronously.

The message may be a Biphase Mark Code (BMC) message.

When the predetermined count value has not been reached, the method may determine whether a message has restarted and is of a predetermined length.

The method includes outputting a clock signal from the clock to the counter.

The method includes aligning a timing of the message between a clock signal output from the clock and at least one flip flop.

Various exemplary embodiments are also related to a Universal Serial Bus Power Deliver (USBPD) circuit including a transceiver configured to receive a message and output a digital representation of the message, an asynchronous counter configured to determine a number of ripples in the message received from the transceiver, a latching circuit configured to mark a beginning and end of a received message of predetermined length, a clock circuit configured to turn on after a message is received of predetermined length, a first synchronous counter configured to begin counting at the end of the received message, and a second synchronous counter configured to count an off time of the received message and compare the off time to a predetermined value, wherein the clock circuit is turned off when the predetermined value is reached.

The counter may include a most significant bit counter.

The analog receiver may include a band pass filter and a comparator.

The circuit as described above, wherein the message is a Biphase Mark Code (BMC) message.

The clock circuit may output a clock signal to the first synchronous counter.

The clock circuit may output a clock signal to the second synchronous counter.

The clock circuit may output a clock signal to the first synchronous counter.

The circuit may include at least one flip flop configured to align a timing of the message with a clock signal output from the clock circuit.

The transceiver may include a comparator to compare a voltage level of the incoming message to a reference voltage and output an asynchronous data stream when the message voltage is greater than the reference voltage.

BRIEF DESCRIPTION OF THE DRAWINGS

Additional objects and features of the invention will be more readily apparent from the following detailed description and appended claims when taken in conjunction with the drawings. Although several embodiments are illustrated and described, like reference numerals identify like parts in each of the figures, in which:

DETAILED DESCRIPTION

Figure 1:
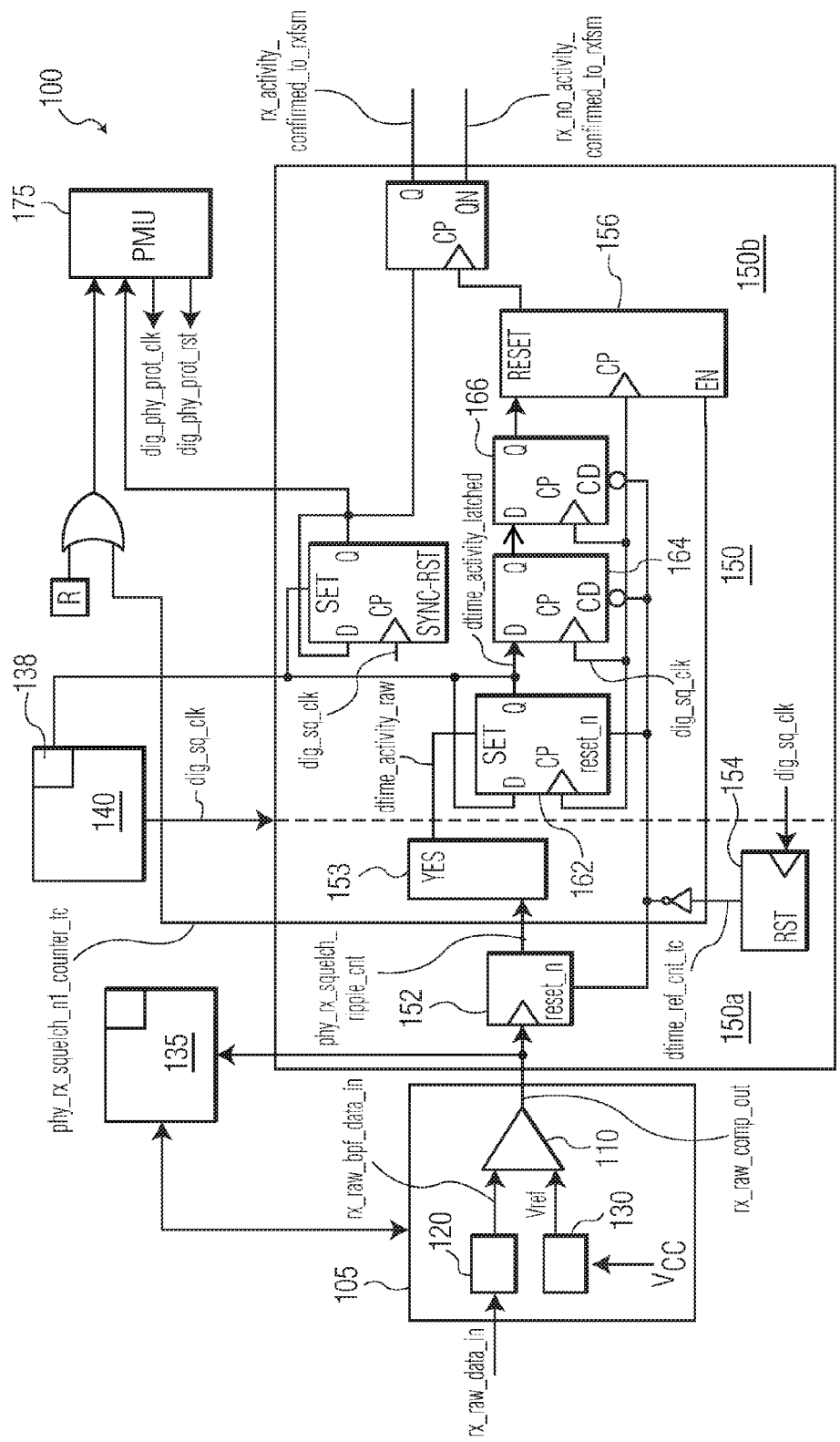
FIG. 1 illustrates a squelch detection and power circuit in accordance with embodiments described herein.

It should be understood that the figures are merely schematic and are not drawn to scale. It should also be understood that the same reference numerals are used throughout the figures to indicate the same or similar parts.

The descriptions and drawings illustrate the principles of various example embodiments. It will thus be appreciated that those skilled in the art will be able to devise various arrangements that, although not explicitly described or shown herein, embody the principles of the invention and are included within its scope. Furthermore, all examples recited herein are principally intended expressly to be for pedagogical purposes to aid the reader in understanding the principles of the invention and the concepts contributed by the inventor(s) to furthering the art, and are to be construed as being without limitation to such specifically recited examples and conditions. Additionally, the term, "or," as used herein, refers to a non-exclusive or (i.e., and/or), unless otherwise indicated (e.g., "or else" or "or in the alternative"). Also, the various embodiments described herein are not necessarily mutually exclusive, as some embodiments can be combined with one or more other embodiments to form new embodiments. Descriptors such as "first," "second," "third," etc., are not meant to limit the order of elements discussed, are used to distinguish one element from the next, and are generally interchangeable. Values such as maximum or minimum may be predetermined and set to different values based on the application.

USB has earned a reputation of being the most widely used and most popular interface. The latest type-C plug/receptacle mechanical pinout is touted to be "the last interface" because of its small form factor, flippability on side, and an ability to be used on both ends of a cable. Such flexibility makes USB very appropriate and appealing to fulfill the power and data requirements of portable gadgets, computing devices, and other electronic apparatuses. A cable with a USB interface can be used as a simple data and/or power cable, and it can also fit high-end applications with power ratings of up to 100 W, data flow of up to 10 Gbps, and alternate modes like Display-Port, HDMI or any custom interface.

When configuration control lines CC1 or CC2 of a configuration channel (CC) of a USB type-C connector are used for Biphase Mark Code (BMC) encoded power-delivery messaging, the receiver circuit of the power may detect the incoming activity and react to it within specified time. This receive event informs the system that it should not initiate a new transmit function while a confirmed activity is seen on the receive path. Embodiments described herein include circuits to achieve these goals, while also helping the system to consume lower power.

The type-C based Universal Serial Bus Power Delivery (USBPD) specification explains how a USBPD physical layer (PHY) or controller part may handle receive (RX) and transmit (TX) messages. In the specification, a receiver circuit may detect and react to an incoming signal. The specification explains how a transmit path of a circuit may hold back in this scenario, but it does not give any implementation details. The USB type-C specification also does not discuss using this circuit to conserve an overall current consumption of the part.

Embodiments described herein include circuit design and architecture, power conservation architecture, aspects of clock gating, and oscillator powering down in idle modes as ways to reduce current consumption.

When a new BMC message (also described herein as "activity") is seen on a RX path of USBPD's PHY layer, a digital squelch circuit as described herein may look at the activity asynchronously (without a clock). After sufficient toggles are measured, an asynchronous request is sent to a clock management controller to turn on an oscillator and start a clock pulse. As the oscillator is powered-up, and the clock starts toggling, a squelch circuit continues to request a clock signal as long as there is activity on RX path.

Once the activity is gone, the squelch circuit makes sure that the line has really gone silent by waiting for a predetermined period of time before de-asserting requests for the clock. When different clock requests have been de-asserted, the clock management controller sends a power-down signal to the oscillator, to conserve power in the system. The same digital squelch circuit also generates appropriate signals such as squelch-activity-confirmed, squelch-inactivity-confirmed signals to the USBPD's receive and transmit state machines.

FIG. 1 illustrates a squelch detection and power circuit 100 in accordance with embodiments described herein. Referring to FIG. 1, a transceiver 105 having an analog receiver input of power message data is a pre-input of a digital squelch circuit 150. The digital squelch circuit 150 may include an asynchronous side 150a and a synchronous side 150b (separated by a dotted line in FIG. 1). The transceiver 105 includes a comparator 110, a receive band pass filter (BPF) 120, and a resistor divider network 130. The transceiver 105 may input an analog signal and output an asynchronous digital signal. Embodiments are not limited thereto, as the incoming signal may be a digital message such that the BPF component 120 may be bypassed.

When a type-C USB circuit has confirmed an "attach" between two devices, the comparator 110 and receive BPF 120 are kept powered. The transmit side (not illustrated) of the transceiver 105 is kept powered-down unless there is a need to transmit. The resistor divider network 130 receives a nominal Vcc from the digital squelch circuit 100 and outputs a reference voltage Vref to the comparator 110.

Upon receiving a power message, the comparator 110 compares the voltage level of an incoming message to Vref and outputs an asynchronous data stream to the digital squelch circuit 150 if the message voltage is greater than Vref by a predetermined amount. The input to the digital squelch circuit 150 from the transceiver 105 may have a designation such as "rx_raw_comp_out."

After confirming the squelch, the digital squelch circuit 150 sends an enable signal designation such as "rx_activity_confirmed" to the transceiver 105. Using this signal, a digital controller 135 enables a full receive path, and also the transmit path of the transceiver 105. The transmit path is enabled, because before the digital controller 135 comes to know about the received message, the digital squelch circuit 150 hardware may send out a response message within 75 μs. Thus hardware may ensure that the transmit path stays enabled a sufficient duration. This same signal also keeps requesting a clock 140 from a clock management controller 138 for a long enough duration to synchronize activity within the digital squelch circuit 150. The clock signal may be designated "dig_sq_clk". The "rx_raw_comp_out" signal from the transceiver 105 may also be sent from a receive data path to the digital controller 135. The transceiver 105 includes an analog receiver and BFP 120, a noise cancellation circuit, and a waveform shaper followed by an even numbered chain of invertors (not illustrated). The transceiver 105 enables a digital output to have a BMC square wave with a desired CMOS amplitude.

One job of the digital squelch circuit 150 is to confirm the presence or absence of activity on the output of transceiver 105 (in a low-power mode). When this is done, the digital squelch circuit 150 may enable or disable the full-power analog receive and transmit, and then send (or de-assert) requests to the clock management controller 138 configured to receive an output that may be designated as "dig_phy_prot_clk" from a power management unit (PMU) 175.

The digital squelch circuit 150 may include three counters. Counter 152 is an asynchronous ripple counter. Counter 154 is a first synchronous counter and counter 156 is a second synchronous counter. Timing diagrams of the counters and other components are described in relation to FIGS. 2 and 3.

An output of the comparator 110 of the transceiver 105 is used as an input to the asynchronous ripple counter 152. Using BMC, the asynchronous ripple counter 152 counts the number of rising-edge events on a signal that may be designated a "rx_raw_comp_out" signal. The count output value is available as designation "phy_rx_squelch_ripple_cnt[n:0]" which is a bus output to a most significant bit (MSB) sub-counter 153.

Asynchronous counter 152 is reset with a Power on Reset (PoR) signal, and later by the time counter (TC) of the first synchronous counter 154. As described herein, if a clock 140 is stopped, then the output designated as "dtime_ref_cnt_TC" output from the first synchronous counter 154 will not be input to the PMU 175. However, the stopping of the clock 140 is dependent on the activity. The clock 140 may stop at any count value of the first synchronous counter 154. It may happen, that clock 140 stops when the first synchronous counter 154 is at maximum value, which may be predetermined. In such a case, the dtime_ref_cnt_TC is not just a pulse, but it stays asserted. That would keep the asynchronous counter 152 locked down in reset. This situation was solved by taking dtime_ref_cnt_TC as a designation such as "phy_rx_squelch_n1_counter_TC" to sync-clk-request of the clock management controller 138. In this way, when terminal count is asserted, this would ensure at least one more clock is provided by PMU 175, so the first synchronous counter 154 rolls over.

When the clock 140 is stopped, asynchronous ripple counter 152 will count a certain number of events of rx_raw_comp_out, count the most significant bits (MSB) of the incoming signal, and asynchronously set the flip-flop 162 which generates "dtime_activity_latched". This signal will then set the clk_start_request that is sent to the PMU 175, which then ungates the clock 140, and clock 140 starts running.

When the clock 140 is running, by the time a reset comes from dtime_ref_cnt_TC from the first synchronous counter 154, if the asynchronous counter 152 had reached a certain value, this would confirm that enough toggles were seen by the comparator 110 within a certain time-window to represent sufficient message activity to start the clock 140.

This comparison is done in a combined manner. The asynchronous counter 152 also looks at the most significant bits (MSB) using a sub-counter 153 to determine if a maximum number of bits is reached. The maximum number of bits may be predetermined. If yes, an output of the asynchronous counter 152 bit counter 153 is latched by flip flop 162 in a subsequent comparator 110 output event. This may be done, so that the whole count value of the asynchronous counter 152 does not cross the clock-domains. In such a situation, there lies a risk of bus bits changing at different times, and the synchronous side 150a latching a wrong value.

The output of the flip-flop 162 "dtime_activity_latched" is then synchronized through flip flops 164 and 166 to the clock domain as "dtime_activity_sync" signal. This signal resets the second synchronous counter 156.

The first synchronous counter 154 may keep track of the real time of the clock 140. When the clock 140 is running, the first synchronous counter 154 uses the clock 140, and counts the clock's rising edges up to a maximum predetermined value. Once the first synchronous counter 154 has reached a certain maximum value, it outputs "dtime_ref_cnt_TC" signal that is used by many components in the digital squelch circuit 150. This time counter (TC) is used to reset the asynchronous counter 152, and the three flip flops 162, 164, and 166 that latch the last detection of message activity from the transceiver 105.

This dtime_ref_cnt_TC signal from the first synchronous counter 154 is also used as a synchronous enable to the second synchronous counter 156 that counts no activity time-slices.

After the activity has died down, the second synchronous counter 156 waits long enough to confirm a cessation of activity. Once the second synchronous counter 156 confirms that activity has stopped for a minimum time, then the second synchronous counter 156 may inform the receive-state machine, which then disables analog circuitry in the transceiver 105 that consumes a large amount of power. The second synchronous counter 156 also requests to clock management controller 138 to receive a "phy_prot_clk" signal from PMU 175 to stop the clock 140 and further conserve power. Once this happens, then the digital receiver squelch circuit 150 goes back to an asynchronous state to wait for activity one again.

While activity is present, the dtime_activity_sync output from flip flop 166 keeps the second synchronous counter 156 counter in reset. At a first instance of dtime_activity_sync going down, the second synchronous counter 156 comes out of reset.

From that point on, for every dtime_ref_cnt_TC pulse output from the first synchronous counter 154, the second synchronous counter 156 advances by 1. Once the second synchronous counter 156 reaches its maximum value, it asserts its TC.

Thus the second synchronous counter 156 may have two TC outputs, generated by comparing the count against two different maximum values.

For a first shorter maximum value, the second synchronous counter 156 may generate rx_activity_confirmed_to_rxfsm signals to indicate to a receive-state machine that a receive signal is present. This is because a receiver finite state machine (FSM) may need to quickly know about the receive activity status.

For a second longer maximum value, the second synchronous counter 156 may generate a no_activity_confirmed_clken_anaen_int signal to send to the transceiver 105, transmitter, and clock management controller 138. This is because the transmit block and clock 140 from clock management controller 138 may keep running long enough to be able to send out a response message Once the squelch circuit 150 has requested the clock 140 from clock management controller 138, the physical layer (controller 135), protocol, and message buffers start to receive the clock signal from the clock 140.

Figure 2:
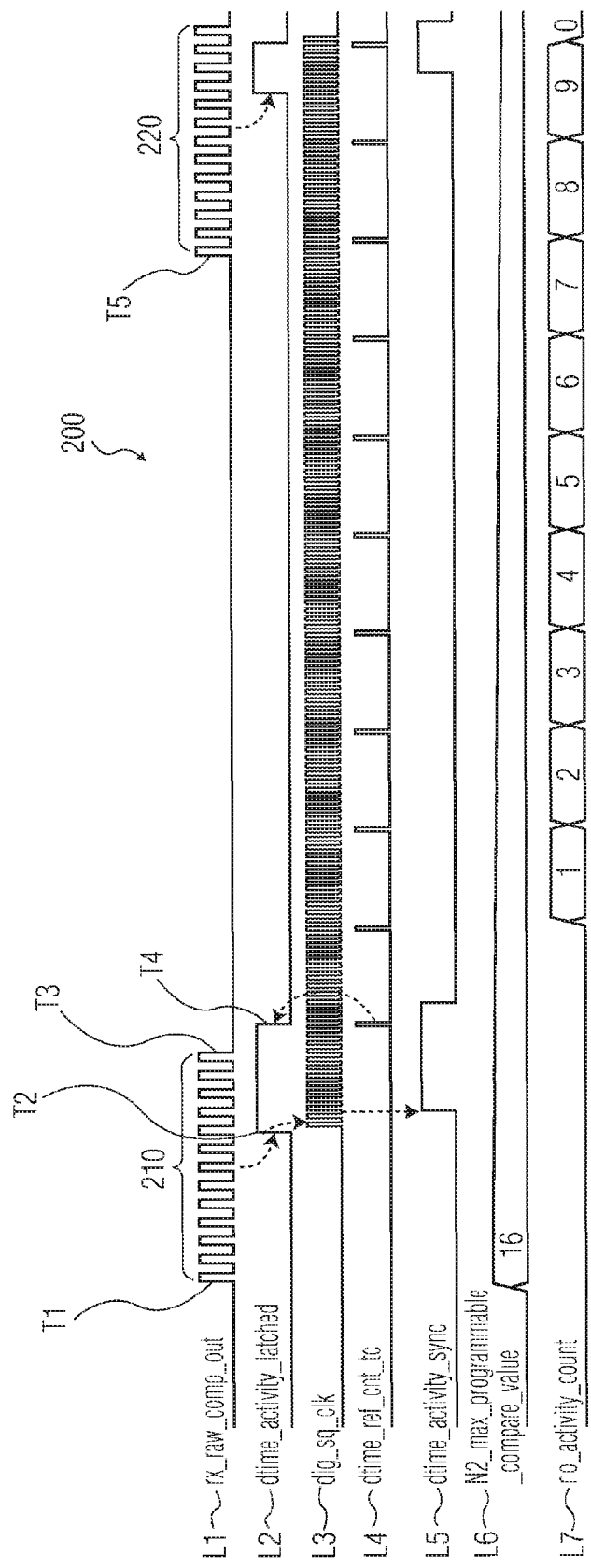
FIG. 2 illustrates a digital squelch timing diagram in which a clock and analog receive-transmit stay enabled without interruption in accordance with FIG. 1.

FIG. 2 illustrates a digital squelch timing diagram 200 in which a clock 140 and transceiver 105 stay enabled without interruption in accordance with FIG. 1. A first signal "rx_raw_comp_out" output from the comparator 110 of the transceiver 105 indicates at time T1 that new activity is observed at the transceiver 105. At a time T2, after a predetermined number of most significant bits is counted by MSB counter 153, the flip flop 162 is latched to begin outputting "dtime_activity_latched." This signal is output to the clock controller 138, which shortly thereafter starts the clock signal "dig_sq_clk." Flip flops 164 and 166 are used to verify the "dtime_activity_latched" signal. The time delay of dtime_activity_latched passing through flips flops 164 and 166 produces the synchronized signal "dtime_activity_sync" on the fifth line L5 of the timing diagram 200. The "dig_sq_clk" is output from clock 140 and illustrated at L3. This clock signal is input to the first synchronous counter 154. The first synchronous counter in turn outputs a signal that tracks the clock signal at regular intervals and may be designated "dtime_ref_cnt_tc" illustrated in line L4 of the timing diagram 200.

Referring to L1, when a receive message 210 ends at time T3, then begins a period of no activity received at the transceiver 105. This cessation of the message 210 cycles through the asynchronous counter 152, MSB counter 153, and flip flop 162 to transition from high to low at time T4 on line L2. Line L5 dtime_activity_sync copies this pattern which is fed into the Reset pin of the second synchronous counter 156.

The second synchronous counter 156 counts a number of pulses of the "dtime_ref_cnt_tc" illustrated on line L4 over the time period of no activity input from "dtime_activity_sync" of L5. An output which may be designated "no_activity_count" of the second synchronous counter 156 may be illustrated on line L7 and compared by the controller 140 to a maximum count value L6 to determine inactivity. As illustrated at time T5, a second receive message 220 is received by the transceiver 105. New activity comes at time T5 before the second synchronous counter 156 could reach its TC. The presence of a minimum message length is ultimately reflected in the L5 signal at time T6. In the case illustrated in FIG. 2, a maximum count value to determine inactivity was set at sixteen counts. Because the period of inactivity did not reach sixteen counts, the clock signal at L3 will remain on and the count for inactivity will begin again. The newly incoming activity would reset the second synchronous counter 156; and the clock 140 and transceiver 105 stay enabled without interruption.

Figure 3:
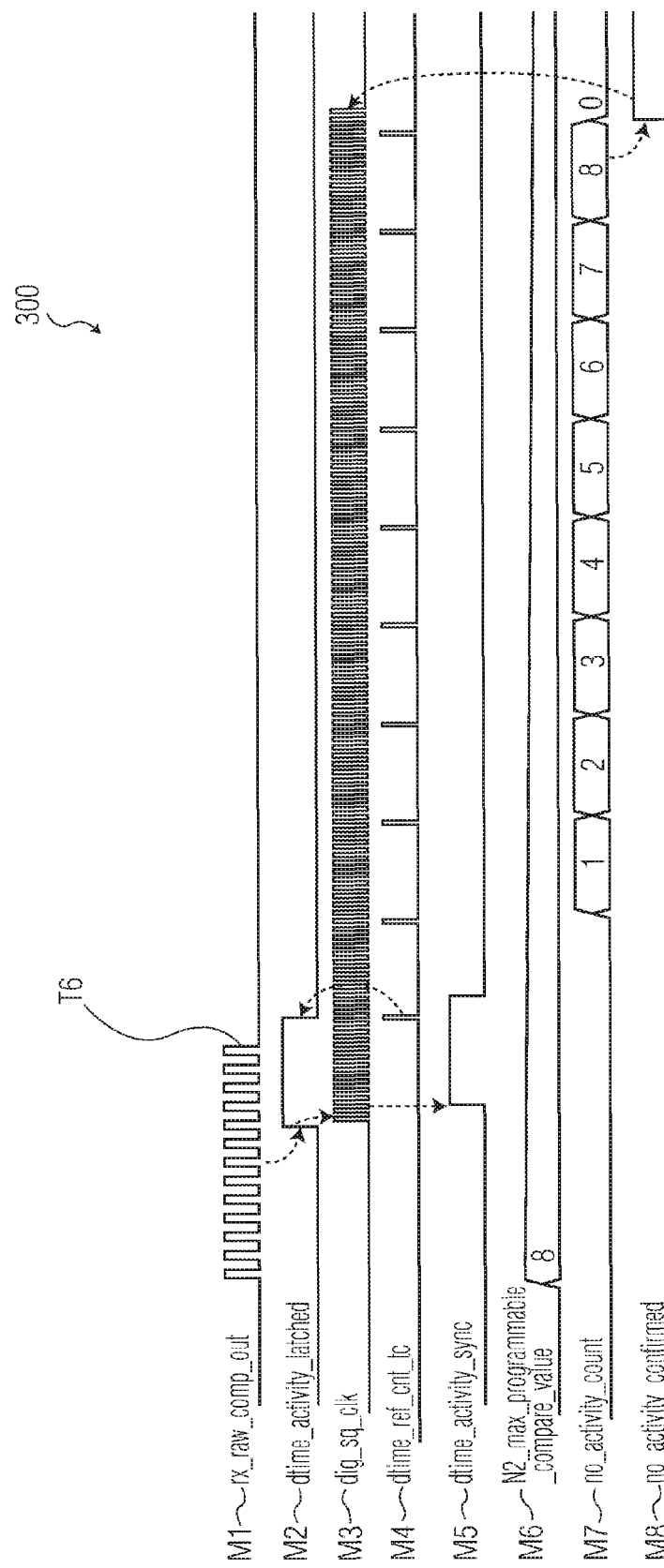
FIG. 3 illustrates a digital squelch timing diagram in which a clock and analog receive-transmit get disabled in accordance with FIG. 1.

FIG. 3 illustrates a digital squelch timing diagram 300 in which a clock and analog receive-transmit get disabled in accordance with FIG. 1. Similar to the timing diagram of FIG. 2, using M line designations instead of L line designations, new activity is observed on line M1 which causes a pulse on line M2 representing activity of the asynchronous counter 152. Activity of the asynchronous counter starts the clock 140 represented on M3. Similar to FIG. 2, after a clock signal is input to the first synchronous counter 154, the first synchronous counter 154 outputs dtime_ref_cnt_TC illustrated in line L4 of the timing diagram 300. Similar to FIG. 2 above, line M5 dtime_activity_sync copies the M2 pattern. In FIG. 3 after an activity event ends at time T6, another activity event does not commence. Line M6 represents that a maximum value to determine whether the no activity period is true is a value of eight. Line M7 represents the "no_activity_count" of the second synchronous counter 156, and when this counter reaches eight, no activity is confirmed by a pulse at line M8. In FIG. 3 the second synchronous counter 156 detects no activity and reaches its TC. When no activity is confirmed at line M8, clock 140 and analog transceiver 105 become disabled.

Figure 4:
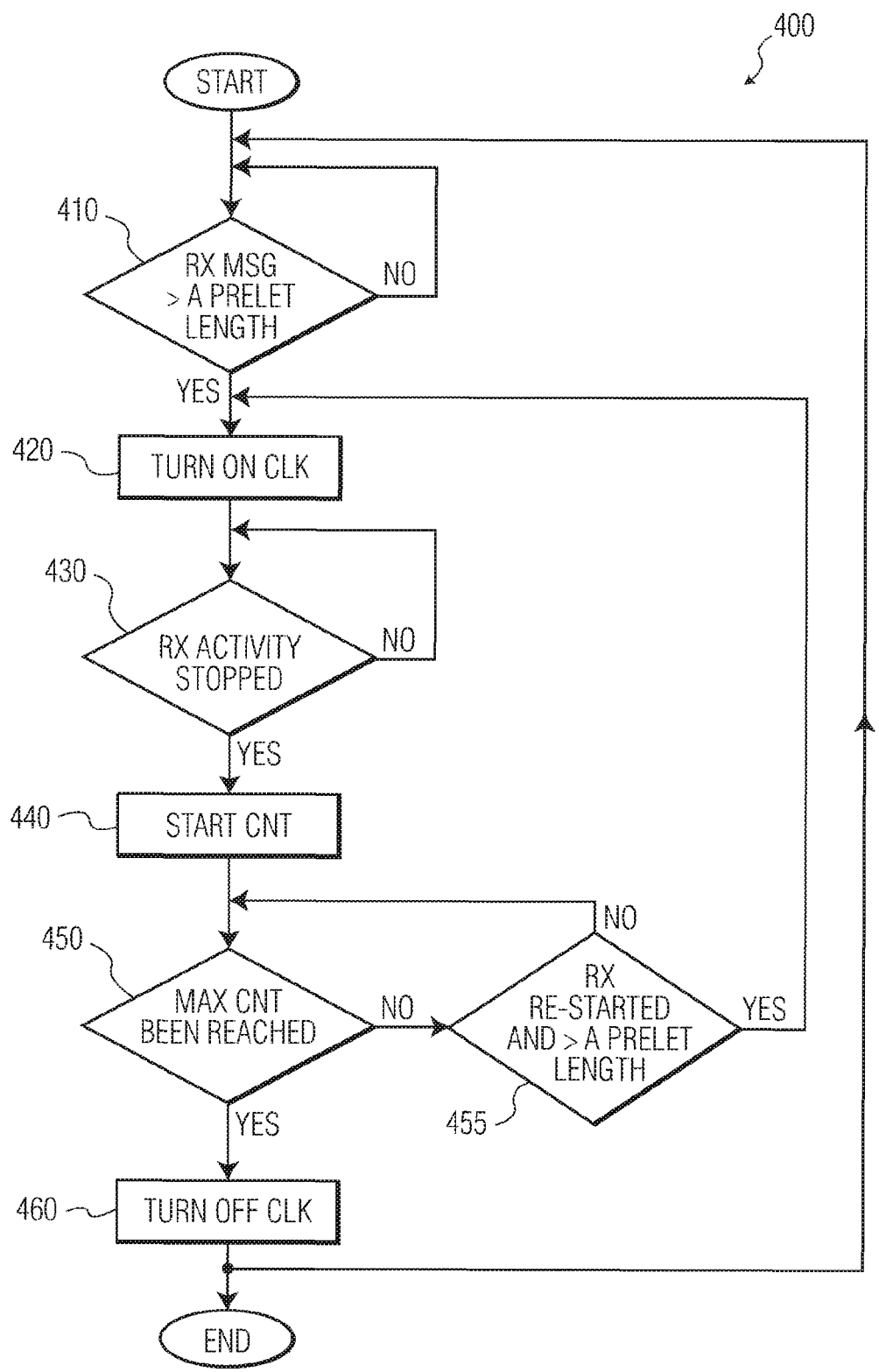
FIG. 4 illustrates a flow diagram illustrating steps of the circuit and timing in accordance with FIGS. 1-3.

FIG. 4 illustrates a flow diagram 400 illustrating steps of the circuit and timing in accordance with FIGS. 1-3. These steps may be performed by the circuit components illustrated in FIG. 1 under the control of controller 135. As illustrated in FIG. 4, a first step 410 may determine if a received message into the transceiver 105 is of a predetermined length. This may also be stated that the first step may determine whether at least a predetermined length of initial bits of a message is received. If the message is not a predetermined length, or the predetermined length of initial bits is not received (NO), this step is repeated. If the message is a predetermined length, or the predetermined length of initial bits is received (YES), the clock 140 may be started at step 420.

After the clock 140 is started, a determination is made at step 430 whether the RX activity has stopped, that is, whether there is no activity. If the message continues (NO), this step is repeated. If the message activity has stopped (YES), the controller will start synchronous counters 154 and 156 and start a count CNT at step 440 using the second synchronous counter 156. Step 450 determines whether a maximum CNT value has been reached. If a maximum CNT value has been reached (YES), there has been no signal activity for a maximum period of time, and the circuit clock 140 may be powered down at step 460 to save power. If the maximum time has not been reached (NO), the controller 135 determines at step 455 whether a receive message has been re-started and whether this message is greater than a predetermined length. If the answer to step 455 is YES, the clock 140 is re-started and the flow chart reverts to step 420. If at step 455 the Rx has not been re-started, or if Rx has been re-started but is less than the predetermined length, the determination is sent back to step 450 to determine whether a maximum CNT has been reached.

Embodiments described herein are not limited thereto. The USBPD specification requirements and the low-power architecture of the chip need not necessarily be combined into single circuit. There can be multiple ways to implement the specification and the low power chip architecture.

Embodiments described herein may be used in any USB type-C connector based Cellular Phone, Tablet, Notebook, Laptop, Desktop, Hub, Connector, Dongle, which supports the Power-Delivery specified BMC messaging as would be known to one skilled in the art.

Although the various embodiments have been described in detail with particular reference to certain aspects thereof, it should be understood that the embodiments described herein are capable of other embodiments and its details are capable of modifications in various obvious respects. As is readily apparent to those skilled in the art, variations and modifications can be effected while remaining within the spirit and scope of the embodiments described herein. Accordingly, the foregoing disclosure, description, and figures are for illustrative purposes only and do not in any way limit the embodiments described herein, which is defined only by the claims.

The invention claimed is:

1. A method of controlling a USB (Universal Serial Bus) Power Delivery System, comprising:
   determining whether at least a predetermined length of initial bits of a message is received;
   turning on a clock when the predetermined length is received;
   determining whether the message has stopped;
   starting a counter when the message has stopped;
   determining whether a count value of the counter has reached a predetermined value; and
   turning off the clock when the predetermined count value has been reached.

2. The method of claim 1, comprising receiving the message by an analog circuit.

3. The method of claim 1, wherein the determining of the predetermined length is performed asynchronously.

4. The method of claim 1, wherein the message is a Biphase Mark Code (BMC) message.

5. The method of claim 1, wherein when the predetermined count value has not been reached, determining whether a message has restarted and whether the restarted message is at least the predetermined length.

6. The method of claim 1, comprising outputting a clock signal from the clock to the counter.

7. The method of claim 1, comprising aligning a timing of the message between a clock signal output from the clock and at least one flip flop.

8. A Universal Serial Bus Power Delivery (USBPD) circuit, comprising:
   a transceiver configured to receive a message and output a digital representation of the message;
   an asynchronous counter configured to count a number of bits in the message received from the transceiver;
   a latching circuit configured to mark a beginning and end of the received message;
   a clock circuit configured to turn on after the number of bits in the message is at least a predetermined length; and
   a synchronous counter configured to count an off time after the end of the received message and compare the off time to a predetermined value,
   wherein the clock circuit is turned off when the predetermined value is reached.

9. The circuit of claim 8, wherein the asynchronous counter includes a most significant bit counter.

10. The circuit of claim 8, wherein the transceiver includes a band pass filter and a comparator.

11. The circuit of claim 8, wherein the message is a Biphase Mark Code (BMC) message.

12. The circuit of claim 8, wherein the clock circuit outputs a clock signal to the synchronous counter.

13. The circuit of claim 8, comprising at least one flip flop configured to align a timing of the message with a clock signal output from the clock circuit.

14. The circuit of claim 8,
wherein the transceiver includes a comparator to compare a voltage level of the received message to a reference voltage and output an asynchronous data stream when the voltage level of the message is greater than the reference voltage.

* * * * *